United States Patent [19]
Miyake et al.

[11] Patent Number: 5,839,002
[45] Date of Patent: *Nov. 17, 1998

[54] CAMERA HAVING A LENS BARREL AND METHOD

[75] Inventors: Toshiro Miyake, Kanagawa-ken; Nobuhiko Terui, Chiba-ken, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 777,062

[22] Filed: Dec. 30, 1996

Related U.S. Application Data

[63] Continuation of Ser. No. 455,548, May 31, 1995, abandoned.

[30] Foreign Application Priority Data

May 31, 1994 [JP] Japan .................................. 6-118965
May 30, 1995 [JP] Japan .................................. 7-132056

[51] Int. Cl.$^6$ .................................................. G03B 13/22
[52] U.S. Cl. .............................................................. 396/91
[58] Field of Search .................................. 396/89, 91, 93

[56] References Cited

U.S. PATENT DOCUMENTS

| | | | |
|---|---|---|---|
| 4,613,224 | 9/1986 | Ogasawara | 354/402 |
| 4,878,077 | 10/1989 | Maeno et al. | 354/400 |
| 4,897,683 | 1/1990 | Suzuki et al. | 354/400 |
| 4,931,820 | 6/1990 | Matsuzawa et al. | 354/402 |
| 4,952,962 | 8/1990 | Suzuki et al. | 354/400 |
| 4,959,728 | 9/1990 | Takahashi et al. | 358/228 |
| 5,065,175 | 11/1991 | Suzuki et al. | 354/400 |
| 5,130,734 | 7/1992 | Tanaguchi et al. | 354/400 |
| 5,179,407 | 1/1993 | Kusaka et al. | 354/400 |
| 5,189,459 | 2/1993 | Watanabe et al. | 354/402 |
| 5,206,677 | 4/1993 | Onuki et al. | 354/400 |
| 5,315,345 | 5/1994 | Kawasaki et al. | 354/484 |
| 5,412,448 | 5/1995 | Kunishige | 354/400 |
| 5,416,559 | 5/1995 | Uenaka | 354/402 |
| 5,552,847 | 9/1996 | Watanabe et al. | 354/195.12 |

FOREIGN PATENT DOCUMENTS 1-213612  8/1989  Japan .

*Primary Examiner*—Safet Metjahic
*Assistant Examiner*—John Chizmar
*Attorney, Agent, or Firm*—Oliff & Berridge, PLC

[57] ABSTRACT

A camera lens barrel, which is connectable to a camera, includes at least one photographic lens, a lens driving control device, a lens driving device, a memory device and a communications device. The photographic lens composes a photographic image at a designated position in the camera. The lens driving control device controls the lens driving control device to drive the photographic lens based on a lens driving control amount. The memory device stores lens driving capability data used to determine the lens driving control amount. The lens driving capability data include at least a characteristic lens driving amount relating to the photographic lens. The communications device is connectable to the camera such that the lens driving capability data can be communicated to the camera.

41 Claims, 15 Drawing Sheets

LENS DRIVING CAPABILITY DATA

| LENS DRIVING AMOUNT | LENS DRIVING TIME |
|---|---|
| Ld1 | Td1 |
| Ld2 | Td2 |
| ⋮ | ⋮ |
| Ldn | Tdn |

FIG.3

LENS DRIVING CAPABILITY DATA

| LENS DRIVING AMOUNT | LENS DRIVING TIME | | | |
|---|---|---|---|---|
| | ENVIRONMENT I | ENVIRONMENT II | | ENVIRONMENT X |
| Ld1 | TdI1 | TdII1 | | TdX1 |
| Ld2 | TdI2 | TdII2 | | TdX2 |
| — | — | — | — — — — | — |
| Ldn | TdIn | TdIIn | | TdXn |

FIG.9

CAMERA HAVING A LENS BARREL AND METHOD

This is a Continuation of application Ser. No. 08/455,548 filed May 31, 1995, now abandoned.

BACKGROUND OF THE INVENTION

1. Field of the Invention

The present invention relates to cameras, and in particular, to a camera lens barrel and a camera having a lens barrel used in automatic focussing.

2. Description of Related Art

Focus control methods for automatic focus control cameras are known. According to one of these methods, as disclosed in Japanese Laid-Open Patent Publication Hei 1-213614, the lens driving time (i.e., the time interval over which the lens must be driven) must be predetermined, which also requires the lens driving amount to be known in advance. In other words, the camera must determine the driving time required for the lens driving amount during a previous lens driving movement and the subsequent targeted lens driving amount in terms of actual driving time.

Therefore, according to this conventional method, the lens driving amount for at least the previous interval and the actual driving time must be known. In the case of continuous driving in which the lens driving does not stop, neither a lens driving amount nor a lens driving time exists as such. If a lens driving time does exist, only the actual driving time of a small lens driving amount can be obtained. Moreover, because the driving control method is altered to permit accurate stopping over both small lens driving amounts and large lens driving amounts, estimating the driving time of a large lens driving amount from the driving time of a small lens driving amount is difficult. For this reason, the lens driving time cannot be estimated at the time when the shutter release is operated if the lens driving amount is calculated with the overlap servo. Such an overlap servo and its operation are disclosed in, e.g., U.S. Pat. No. 5,153,630.

In addition, according to the conventional method, interchangeable lens driving control methods cannot be used because the relationship between the lens driving amount and the driving time is expressed similarly in a simple formula. Furthermore, in the relationship described above, when the voltage of the power source, temperature, position, and other environmental characteristics are altered, the load torque and the like vary. As a result, these characteristics vary according to the interchangeable lens driving control methods. When the past lens driving amount to be used as a reference value differs greatly from the lens driving amount to be estimated, the accuracy of the estimated driving amount decreases.

SUMMARY OF THE INVENTION

An object of the present invention is to provide a camera system having improved focusing control performance in which the camera can drive the interchangeable lens accurately at all times. Further, the camera can estimate the driving time required for the lens driving, even if the interchangeable lens mounted on the camera has a distinct driving capability from a previous lens, or if the voltage of the power source, temperature, position and the like of the environmental state is changed.

These and other objects are achieved by the camera system of the present invention. The camera system includes a camera and a camera lens barrel, which is detachable from the camera. The camera has a focal point detection device and a control amount calculation device.

The camera lens barrel includes at least one photographic lens, a lens driving device, a lens driving control device and a communications device. The photographic lens forms a photographic image of a subject at a designated position in the camera. The photographic lens has a focal point state detectible by the focal point detection device.

The lens driving control device controls the photographic lens based on a lens driving control amount determined by the control amount calculation device in accordance with results from the focal point detection device. The lens driving device is coupled to the photographic lens and is linked to the lens driving control device. The lens driving device drives the photographic lens along an optical axis.

The memory device is linked to the lens driving control device. The memory device stores the lens driving capability data used to determine the lens driving control amount. The lens driving capability data includes at least a characteristic lens driving amount relating to the photographic lens.

The communications device is linked to the lens driving control device and is connectable to the camera. As a result, the lens driving capability data can be effectively communicated to the camera.

The camera can also include an environmental state detection device that detects an environmental state approximately simultaneously with a release of a shutter. The camera lens barrel can include a data determination device linked to the lens control device. In this embodiment, when the control amount calculation device operates, the data determination device determines lens driving capability data in accordance with the lens driving control amount and the environmental state. Alternatively, the camera can include the data determination device, in which case it is linked to the control amount calculation device.

In addition, both the camera lens barrel and the camera can include environmental state detection devices. In such a case, the data determination device determines lens driving capability data in accordance with the lens driving control amount, a camera environmental state detected by the environmental state detection device of the camera and a lens barrel environmental state detected by the environmental state detection device of the camera lens barrel.

The environmental state detection device of the camera can include at least a power source voltage component and a temperature detection component. The environmental state detection device of the camera lens barrel can include at least a position detection component.

The environmental state detection device components can detect the power supply capability of the power source, a temperature, or a position. The power supply capability can be indicated in terms of a voltage measurement or a resistance measurement.

The lens driving capability data can be transmitted to the camera via the communication device at least once during at least one of a focus detection operation and a lens driving control amount calculation. Alternatively, the lens driving capability data can be transmitted to the camera via the communication device at least once before a focus detection operation.

BRIEF DESCRIPTION OF THE DRAWINGS

A complete understanding of the present invention may be obtained by reference to the accompanying drawings when considered in conjunction with the subsequent detailed description thereof, in which:

FIG. 3 is a chart showing the driving capability data;

FIG. 9 is an explanatory diagram of the driving capability data memory component of the second embodiment;

DETAILED DESCRIPTION OF PREFERRED EMBODIMENTS

Figure 1:
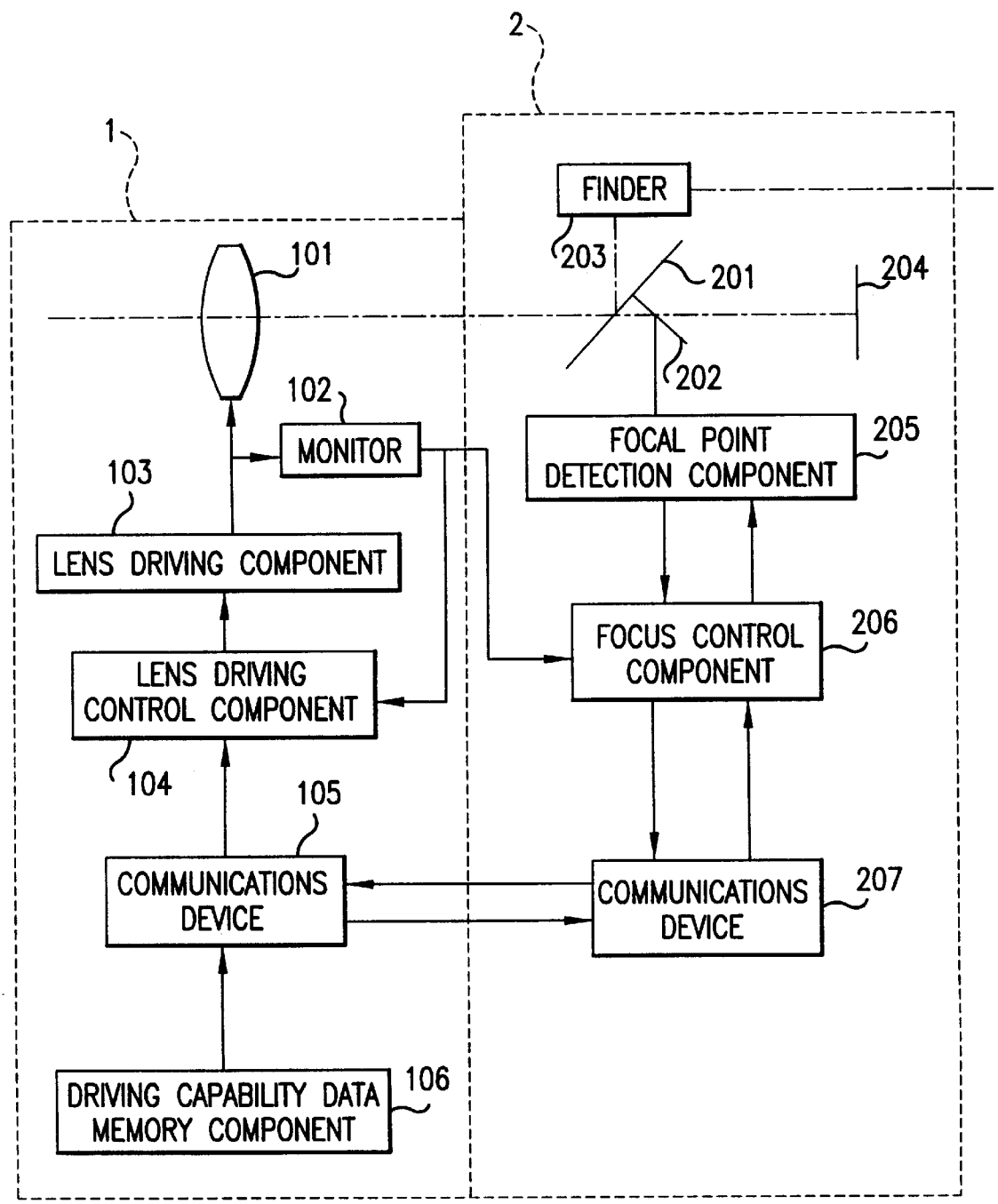
FIG. 1 is a block diagram showing the structure of a first embodiment.

FIG. 1 shows the structure of a first embodiment in which the present invention is applied to the autofocus system in a single lens reflex camera. As depicted by the dashed lines, a detachable lens assembly 1 is shown attached to a camera 2. The lens assembly 1 is equipped with a photographic lens 101, a monitor 102, a lens driving component 103, a lens driving control component 104, a communications device 105 and a driving capability data memory component 106. The camera 2 is equipped with a main mirror 201, a sub-mirror 202, a finder 203, a shutter 204, a focal point detection component 205, a focus control component 206 and a communications device 207. The photographic lens 101 allows the focal point to be adjusted along an optical axis in the photographic optical system. The monitor 102 transmits signals that relate to the movement of the photographic lens 101.

The lens driving component 103 includes a driving source having a DC motor and the like linked by a mechanical transmission system to the photographic lens 101. The lens driving component 103 is controlled by the lens driving control component 104 to drive the photographic lens 101. The focus control component 206 calculates a lens driving amount and transmits it to the lens driving control component 104 via the communications device 207 of the camera 2 and the communications device 105 of the lens 1. The lens driving control component 104 controls the lens driving component 103 according to the feedback of the monitor signal relating to the amount that the photographic lens moves in response to the lens driving amount.

The communications device 105 includes a transmission path linked to the message sending/receiving controller (not shown) and the camera 2. Similarly, the communications device 207 of the camera 2 includes a transmission path linked to the message sending/receiving controller (not shown) and the lens 1. The transmission of information to the camera 2 occurs via the communications device 207.

The driving capability data memory component 106 stores the driving capability data. These driving capability data are used for focus control and are transmitted to the focus control component 206 via the communications device 105 and the communications device 207. The driving capability data relate to the driving characteristics of a specific lens and are expressed in a form that is easily used for focus control and other similar operations in the camera.

Figure 2:
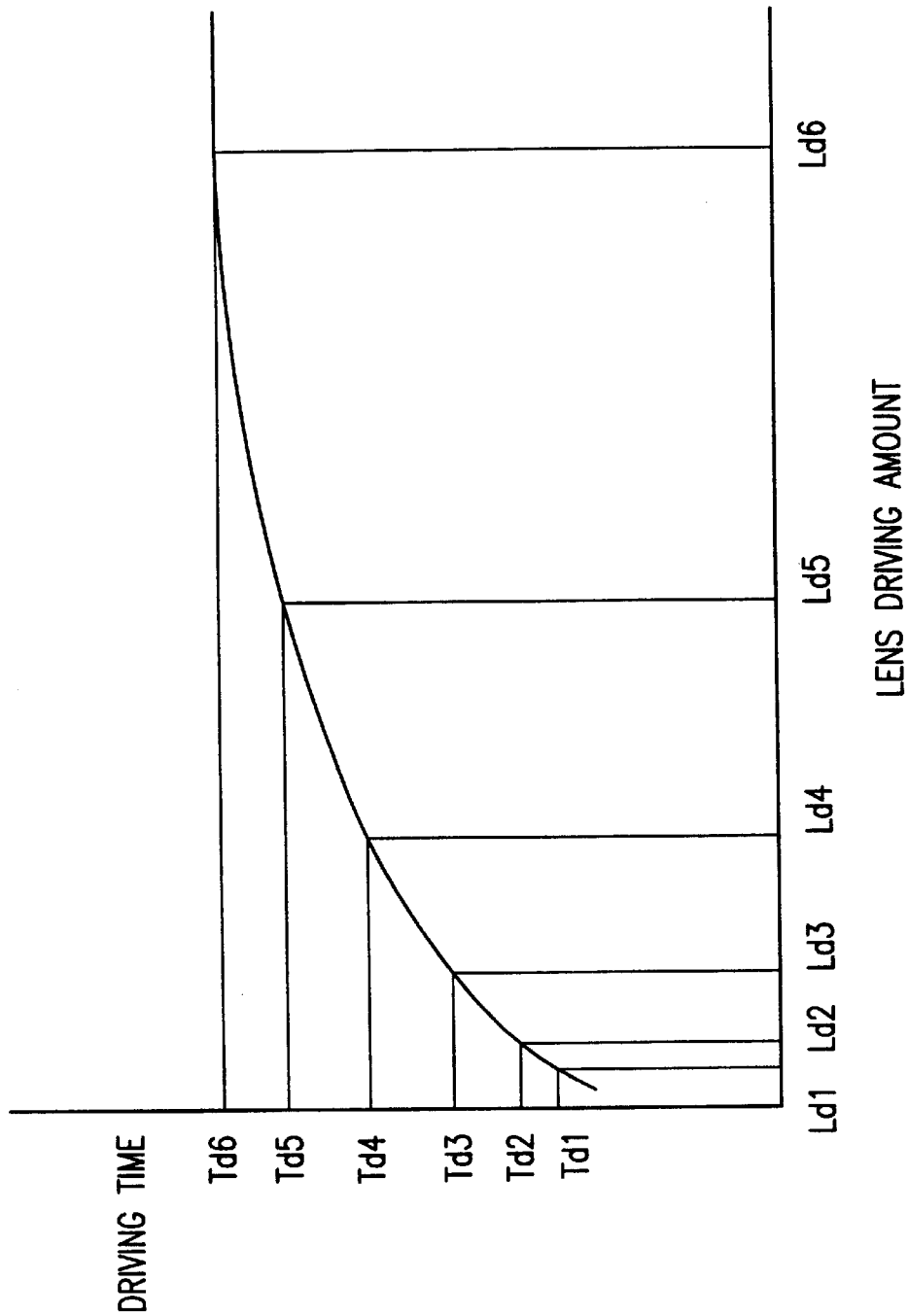
FIG. 2 is an explanatory diagram showing the relationship between the lens driving amount and the driving time.

FIG. 2 shows an example of the relationship between the lens driving amount and the driving time. The lens driving amount varies along the horizontal axis, and the driving time varies along the vertical axis. In general, after the speed of the lens first increases and then becomes constant, the lens subsequently decreases in speed upon approaching the target lens driving amount and then stops. If the driving amount is not great, the lens does not reach its maximum speed. Therefore, the speed of the lens only increases and then decreases, rather than maintaining a maximum speed and eventually stopping. As a result, the non-linear profile shown in FIG. 2 occurs.

With this driving control method, traversing the driving amount designated as Ld1 at a lower speed increases the stopping accuracy. Therefore, the lens is driven at a constant lower speed, and when the lens driving amount reaches the target lens driving amount, the lens is stopped. Accordingly, even if the total lens driving amount is a short distance such as Ld1, it is traversed slowly and driving time is not decreased. The relationship between the lens driving amount and the driving time as described above, however, differs for each lens, due to differences in the control method of the photographic lens 101, the characteristics of the lens driving component 103 and the lens driving control component 104. If the driving method varies according to the lens driving amount in the lens driving control component 104, the resulting profile becomes more non-linear. As a result, if the data of FIG. 2, i.e., the driving capability data, are used as a standard, the characteristics of a particular lens can be expressed. Similarly, if these driving capability data are transmitted to the camera via the communications devices 105 and 207, the driving time required corresponding to the lens driving for each lens can be simply estimated.

As explained above, the relationship between the lens driving amount and the driving time varies non-linearly. Therefore, each of the driving times Td 1, Td 2, Td 3, Td 4, Td 5 and Td 6 for the corresponding number of lens driving amounts Ld 1, Ld 2, Ld 3, Ld 4, Ld 5 and Ld 6 shown in FIG. 2, is shown in the table of FIG. 3 as an expression of the driving capability data. Both the lens driving amount and the driving time can be transmitted to the camera, and either type of data can be expressed in a communications format. If the lens driving amount is expressed in a communications format, for example, the driving capability data include the driving time required for driving the lens 125, 250, 500, 1000, 2000 and 3000 $\mu$m in accordance with a defocus amount calculation. Although the lens driving amount is expressed as a defocus amount in the explanation above, an amount corresponding to the monitor signal relative to the photographic lens movement amount obtained by the monitor 102 can also be used. The values in the table of FIG. 3 can be supplemented with additional values through interpolation and the like to suit particular operating requirements.

The relationship between the lens driving amount and the lens driving time stored as driving capability data can also be expressed as the function of a coefficient or a number of coefficients. Depending upon the lens driving control method used, the function need not be complicated. Therefore, only a small number of coefficients are required to achieve effective control.

Referring to FIG. 1, a luminous flux from a photographic subject passes through the photographic lens 101 of the lens 1 and is divided by a main mirror 201 that includes a half mirror (not shown) and a sub-mirror 202. The greater part of the luminous flux is deflected to a finder 203. Another part of the luminous flux is deflected to an AF sensor of the focal point detection component 205 from the sub-mirror 202. The main mirror 101 and the sub-mirror 202 retract from the photographic optical path when a shutter release (not shown) is actuated and to operate the shutter 204. In the focal point detection component 205, the focus control component 206 performs AF sensor accumulation control, and the defocus amount is calculated after the electrical load accumulation is completed.

The focus control component 206 calculates the lens driving amount based upon the monitor signal. The monitor signal varies relative to the defocus amount determined by the focal point detection component 205, the photographic lens movement amount detected by the monitor 102, and the data being sent to the lens driving control component 104 via the communications device 207 and the communications device 105. In addition, the image movement speed is detected using known methods. If the subject is moving, the image movement due to the subject's movement is estimated, and a necessary lens driving amount is calculated. The driving capability data of the driving capability data memory component 106 are transmitted via the communications device 105 and the communications device 207 so that the lens driving time can be estimated. As explained below, the release operation is also controlled.

Figure 4:
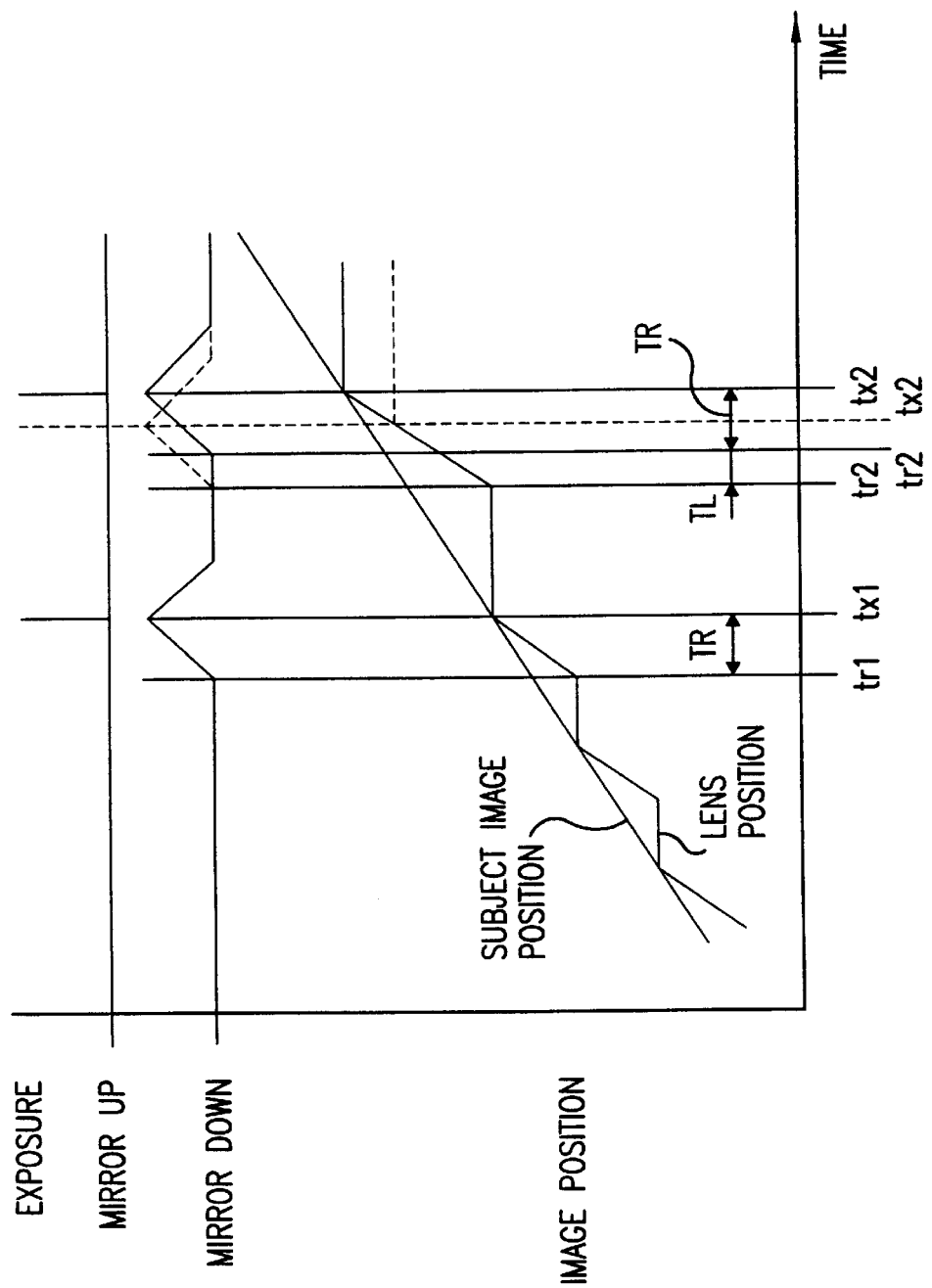
FIG. 4 is a diagram showing the mirror position, exposure timing, lens position and the subject image position when the shutter release is actuated.

As shown in FIG. 4, the driving capability data are used by the focus control component 206. FIG. 4 shows the states in which the subject is moving when the focus control component 206 estimates the image surface movement at a time of the release operation, calculates the lens driving amount and focuses the camera at the time of exposure. The exposure operation is accomplished twice, i.e., once for the first frame, and once for the second frame in a continuous picture taking mode. The timing for exposure, movement of the mirror, the picture object image position and the lens position are also shown in FIG. 4.

During continuous photography, the shutter release is operated at a time tr 1, and the mirror starts to retract (i.e., it moves upward). When the mirror is retracted, the shutter commences operation at the time tx 1. A time TR, which is the interval from the time when the mirror begins retracting until the time when the shutter commences operation, is held constant by the camera. Hereinafter, the time TR will be referred to as the "release time lag."

When the shutter release is actuated during the first frame at the time tr 1, the focus control component 206 calculates the lens driving amount to be adjusted (traversed) by a time tx 1 such that a focussed condition is achieved in the camera after the release time lag TR. The focus control component 206 also sends the lens driving amount to the lens 1. At the same time, the lens driving movement begins, and the release operation is started. A time tr 2 is equivalent to the time at which the shutter release of the second frame occurs. At the time tr 2, the defocus amount has been calculated. The defocus amount was calculated by the accumulation of the AF sensor in the focal point detection component 205 after the completion of the mirror movement.

This process, however, is different from the process of the first frame. In the second frame, the mirror retraction operation does not begin immediately; rather it begins at the time tr 2' after a delay in time of TL (hereinafter referred to as the "release operation delay time"). The exposure is completed at a time tx 2 after a delay equal to TL+TR. The interval over which the lens is stopped in the second frame during continuous photography is longer. As a result, the lens driving amount becomes larger. At the time tx 2' after the release time lag TR, as shown by the dotted line, the driving movement of the lens is not completed. Therefore, a larger defocus occurs at the exposure time tx 2'.

Using this type of focus control, if the lens driving amount, which is capable of driving within the driving time or the designated time required for the lens driving, can be estimated, setting the appropriate release operation delay time TL is possible. If the driving time is estimated using the driving capability data, setting the appropriate release operation delay time TL for different lens driving amounts and for different lenses is possible.

As explained above, the lens driving control component 104 of the lens 1, the driving capability data memory component 106 and other components are embodied in a lens CPU having a ROM, a RAM and the like. Similarly, the focus control component 206 of the camera 2 and the defocus amount calculation of the focal point detection component 205 and other components are embodied in a camera CPU having a ROM, a RAM and the like.

Figure 5:
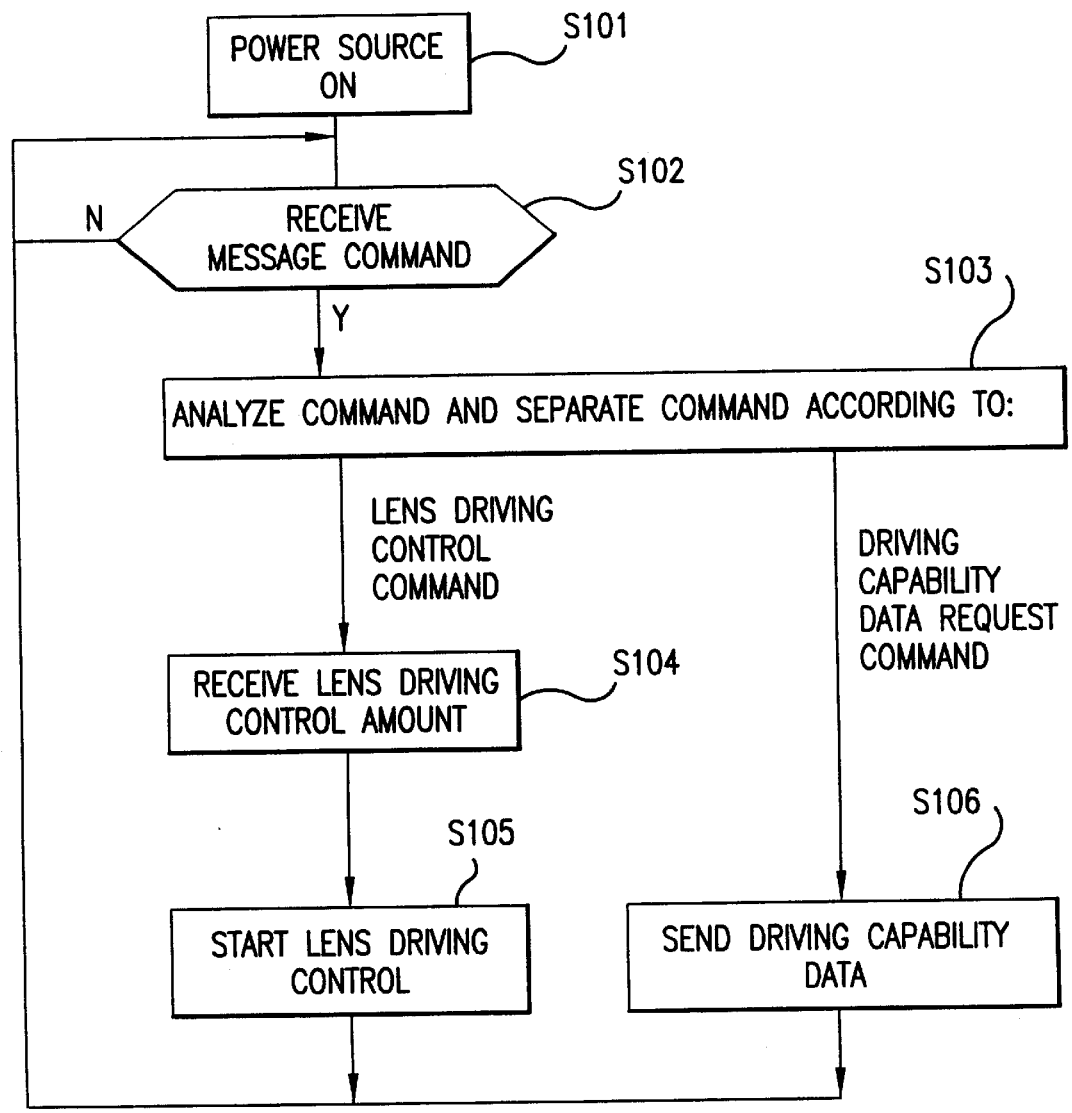
FIG. 5 is a flow chart of the lens CPU operation of the first embodiment.

FIG. 5 is a flow chart showing the operation of the lens CPU. When the power source is initialized in step S101, the lens CPU advances to step S102, checks the receipt of the command message from the camera 2, advances to step S103 and analyzes the command. If the command is the lens driving control command, the lens CPU advances to step S104, receives the message relaying the lens driving amount required to control the camera, and advances to step S105. In step S105, the lens driving control operation begins based upon the lens driving amount. On the other hand, if the command received at the step S103 is the driving capability data request command, the lens CPU advances to step S106, reads the driving capability data from the driving capability data memory component 106, and sends a message to the camera CPU. Subsequently, the lens CPU returns to step S102 and repeats the operations.

Figure 6:
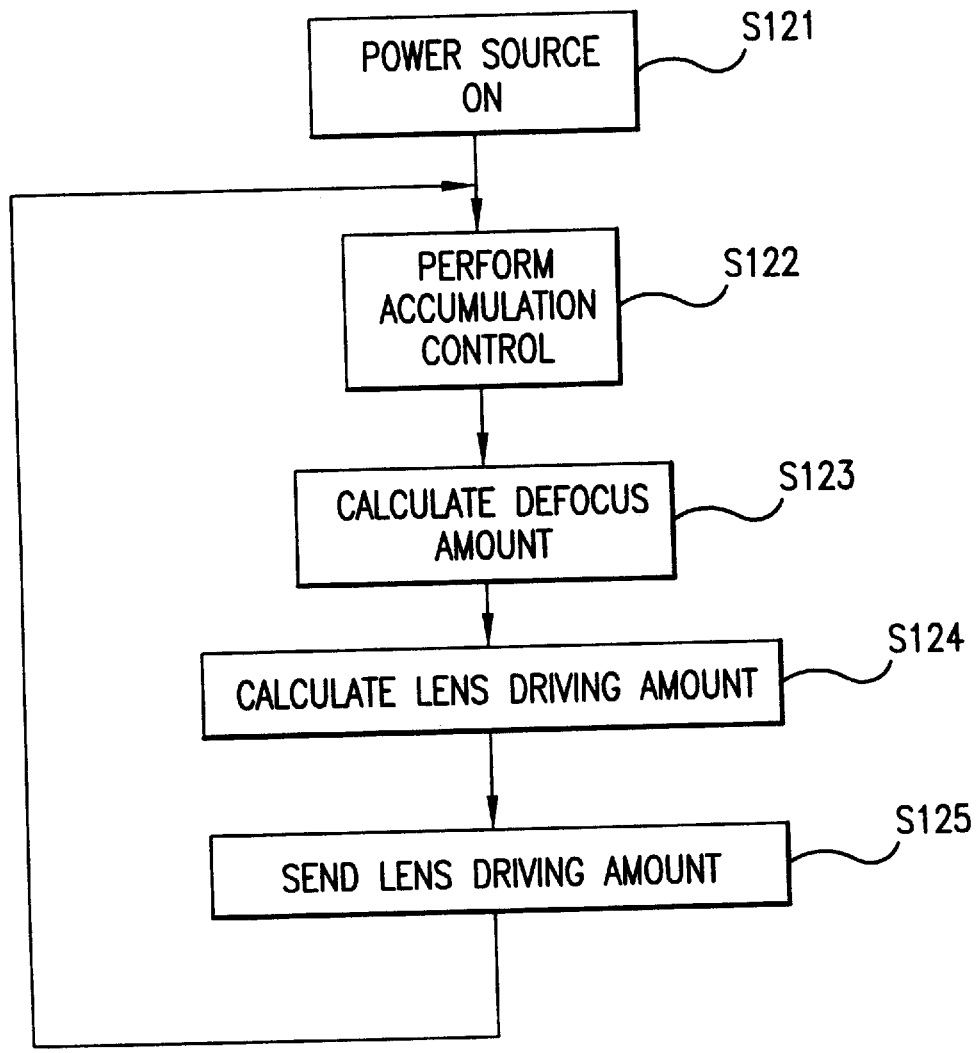
FIG. 6 is a flow chart of the camera CPU operation of the first embodiment.

FIG. 6 is a flow chart showing the operation of the camera CPU. When the power source is initialized in step S121, the camera CPU advances to step S122 and controls the electric load accumulation in the AF sensor of the focal point detection component 204. In step S123, the camera CPU performs AD conversion of the signals from the AF sensor, the defocus amount is calculated, and the results are stored in the memory.

In step S124, the lens driving amount is calculated from the defocus amount calculated in step S123. In addition, the image movement speed is calculated according to a known method based on the current and last defocus amounts and the monitor signals relating to the movement amount of the photographic lens from the monitor 102. If the subject is moving, the estimated lens driving amount is calculated. In step S125, the lens driving amount of the lens 1 is transmitted to the lens CPU. The camera CPU then returns to step S122 and repeats the operations.

Figure 7:
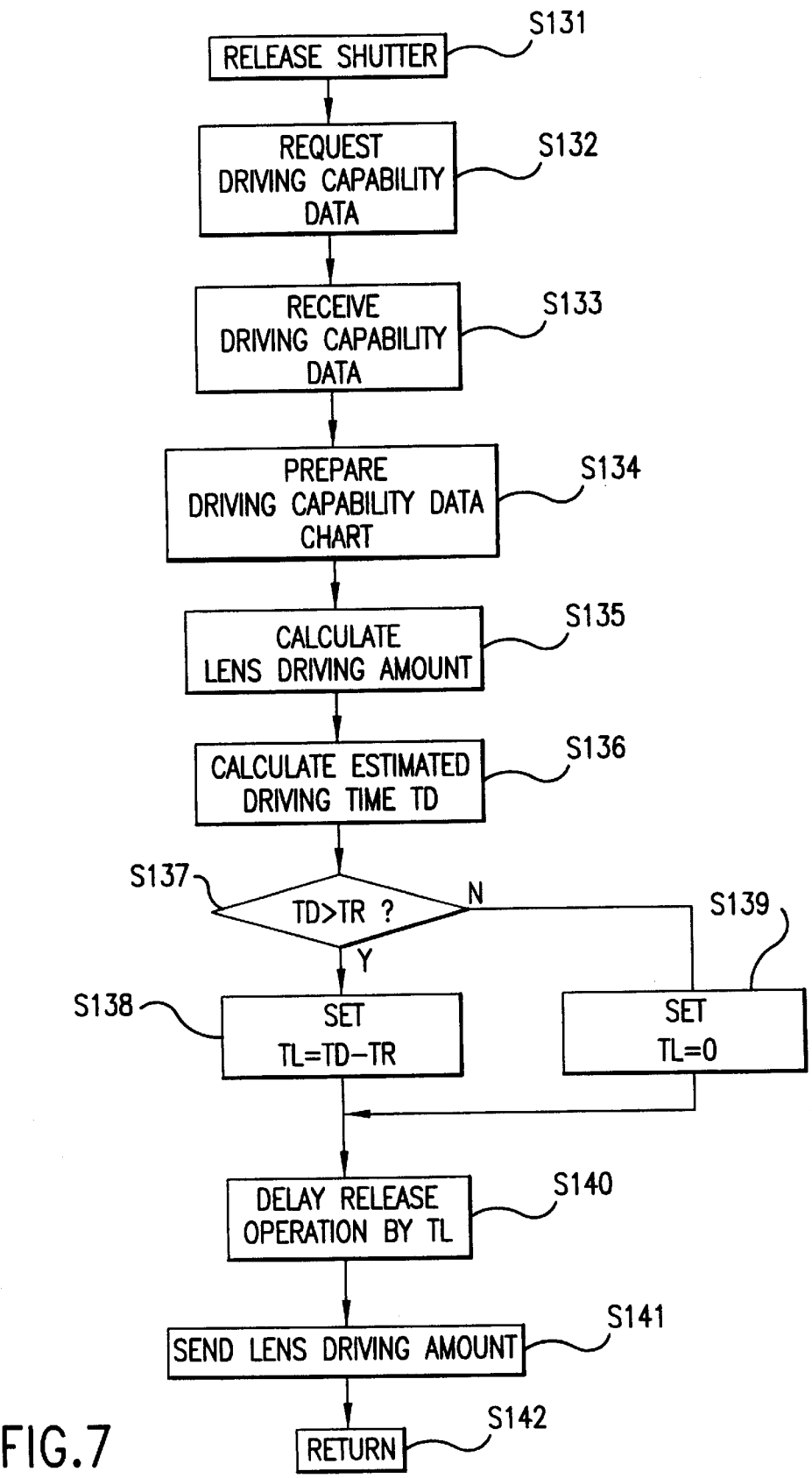
FIG. 7 is a flow chart showing the control process at the time of shutter release using the driving capability data of the first embodiment.

FIG. 7 is a flow chart of the shutter release operation that occurs when the shutter release is actuated during the repeated execution of the main program. The release operation is controlled using the driving capability data. After the shutter is released in step S131, the driving capability data request command is transmitted to the lens CPU in step S132. In step S133, the driving capability data request command is received from the lens CPU. In step S134, the lens driving amount received from the driving capability data relative to the lens driving time is stored in the form of a chart.

In step S135, similar to step S124, the lens driving amount is calculated from the defocus amount stored in the memory of step S123. If the subject is moving, the movement of the subject at the time of exposure after the release time lag TR (which has been stored in the memory), is estimated, and the lens driving amount is calculated. In step S136, the estimated driving time TD is calculated from the relationship of the lens driving amount and the lens driving time stored in the chart. In step S137, the release time lag TR prestored in the memory and the estimated driving time TD are compared. If TD does not exceed TR, the lens CPU advances to step S139, the release operation delay time TL is set equal to 0, and the lens CPU advances to step S140. On the other hand, if TD exceeds TR, the lens CPU advances to step S138, the release movement delay time TL is set equal to TD-TR, and the lens CPU advances to step S140.

In step S140, a timer is set so that the release operation will delay the process by the release operation delay time TL. In step S141, the information relating to the lens driving amount is transmitted to the lens CPU 104. In step S142, the lens CPU returns. The release operation begins after the release movement delay time TL elapses. As a result, the estimated lens driving time TD is equal to TL plus TR, and the camera is controlled such that the exposure will be started after the lens driving operation is completed.

However, if the subject is moving in step S138, and if the release operation delay time TL is set equal to TD-TR, the amount by which the subject moves before the time of exposure increases. Therefore, a possibility exists that correct focussing may not be achieved at the exposure time in some cases.

In step S132, the driving capability data request is made. Completing the request, however, is not necessary at this point, because the request can be completed in step S132, in step S133 or in step S134 of the initial communication with the lens 1. The driving capability data chart prepared from the driving capability data is stored in the memory. By so doing, communications with the lens 1 and the preparation of the driving capability data chart can be completed at one time. In addition, communication can occur according to designated timing during the focal point detection calculation.

Figure 8:
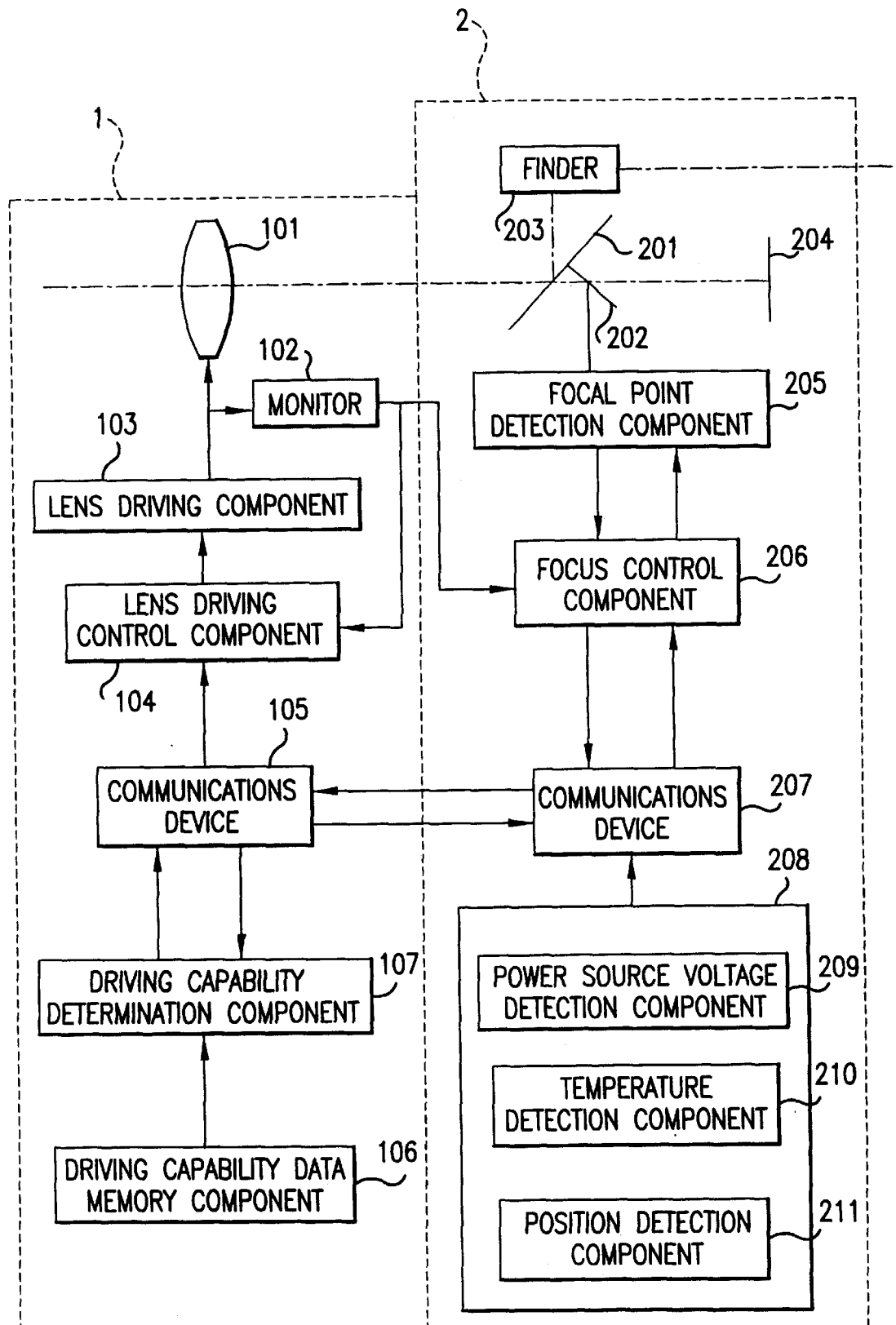
FIG. 8 is a block diagram showing the structure of a second embodiment.

In addition to the structure shown in FIG. 1 and described above, referring to FIG. 8, a second embodiment includes a driving capability data determination component 107 disposed within the lens 1. Further, the data stored within driving capability data memory component 106 are different from the data of the first embodiment, and the camera 1 includes an environmental state detection component 208. The environmental state detection component 208 includes a power source voltage detection component 209, a temperature detection component 210 and a position detection component 211 which detects the position of a focusing lens along the optical axis. Except for these differences, the structure of the second embodiment is the same as the structure of the first embodiment shown in FIG. 1.

The driving capability data determination component 107 obtains information relating to the environmental state from the environmental state detection component 208 of the camera 2 via the communications device 105. The driving capability determination component determines the driving capability data relative to the present environmental state based on information relating to how changes in various environmental states affect the driving characteristics of the lens. This information is prestored in the driving capability data memory component 106. The environmental data refers to the information that is converted to the format for communications relating to the environmental states. Preferably, the driving capability data determination component 107 and the driving capability data memory component 106 are embodied in the lens CPU.

The environmental state detection component 208 determines the environmental data relating to the environmental states of the power source supply capability, temperature and the lens position, and sends these data via the communications device to the lens 1. Preferably, the environmental state detection component 208 is embodied in the camera CPU, to which each sensor is connected. With the environmental state detection component 208, the power source supply capability, the temperature and the position may be detected singly or in combination.

The environmental data relating to the power source supply capability which is transmitted from the power source (not shown) of the camera 2 to the lens 1 includes a supply voltage and an internal resistance. If the voltage and the internal resistance transmitted to the driving source of the lens driving component 103 of the lens 1 are changed, the characteristics of the driving source change proportionally.

In general, batteries are used as the power source of the camera 2. The output voltage of the batteries changes, however, due to use or changes in the temperature. As a result, information relating to the supply voltage is more reliably obtained by measuring the voltage at the power source voltage detection component 209.

If the electric power consumption in the lens driving device is substantial, the internal resistance of the power source must be evaluated as a limit on the power source supply capability. Depending upon the particular camera, the resistance from the contact point of the power source supply of the lens 1 to the power source is substantial. In addition, the internal resistance of the batteries increases as the voltage of the batteries decreases. The internal resistance also varies due to the changes in the temperature. Therefore, the relationship between the voltage, the temperature and the internal resistance of the battery is prestored in the memory. The internal resistance is then calculated from the temperature detection results from the power source voltage and the temperature detection component 210. In addition, in the case of a camera system in which a larger capacity battery having a constant voltage power source is used, a detection device to check the voltage and to calculate the internal resistance can be included.

In addition to power source supply characteristics, if the temperature changes, the viscosity of the oil used in the mechanical transmission system of the lens driving component 103 also changes. As a result, the load torque is changed to account for a difference in the expansion rate of the components of the lens barrel. Depending upon whether the lens barrel is fully extended or fully retracted, the load torque changes due to the weight of the photographic lens 101. The magnitude of the changes in the load torque, and the relationship between them and the environmental states, differ according to the particular photographic lens 101 or the particular lens driving component 103 being used. Therefore, estimating the magnitude of the change is difficult based on the information available from the camera alone. If the environmental states of the lens 1 and the camera 2 are considered to be the same, i.e., if the lens 1 is provided with the information relating to the environmental states from the camera 2, the lens driving characteristics relative to these environmental states can be stored in the memory. As a result, estimating the lens driving characteristics relative to a particular environmental state is possible.

Accordingly, the structure of the present invention provides for sending the information relating to these environmental states to the lens 1 via the communications device of the camera. The driving capability data are then determined in accordance with the environmental state in the driving capability data determination component 107 of the lens 1.

To determine the driving capability data relative to different environmental states, the driving capability data in the different environmental states for a particular lens are stored in the driving capability data memory component 106 in the form of chart as shown in FIG. 9. In FIG. 9, the variables of the environmental states of the environment I, environment II, etc. are equivalent to, e.g., temperature of 0 degrees and 20 degrees. In addition to particular temperatures, however, the environment I, the environment II, etc., must represent a combination of the environmental states, including the supply voltage, the internal resistance, and the lens position. Together, these environments are referred to as the driving capability index of the different environmental states. To determine the driving capability index, individual charts corresponding to the temperature, the lens position, the supply voltage, and the internal resistance is stored in the memory and the driving capability index is derived from the actual values and simulated results. The driving capability data determination device 107 determines the driving capability data for a particular environmental state with reference to the driving capability index.

Figure 10:
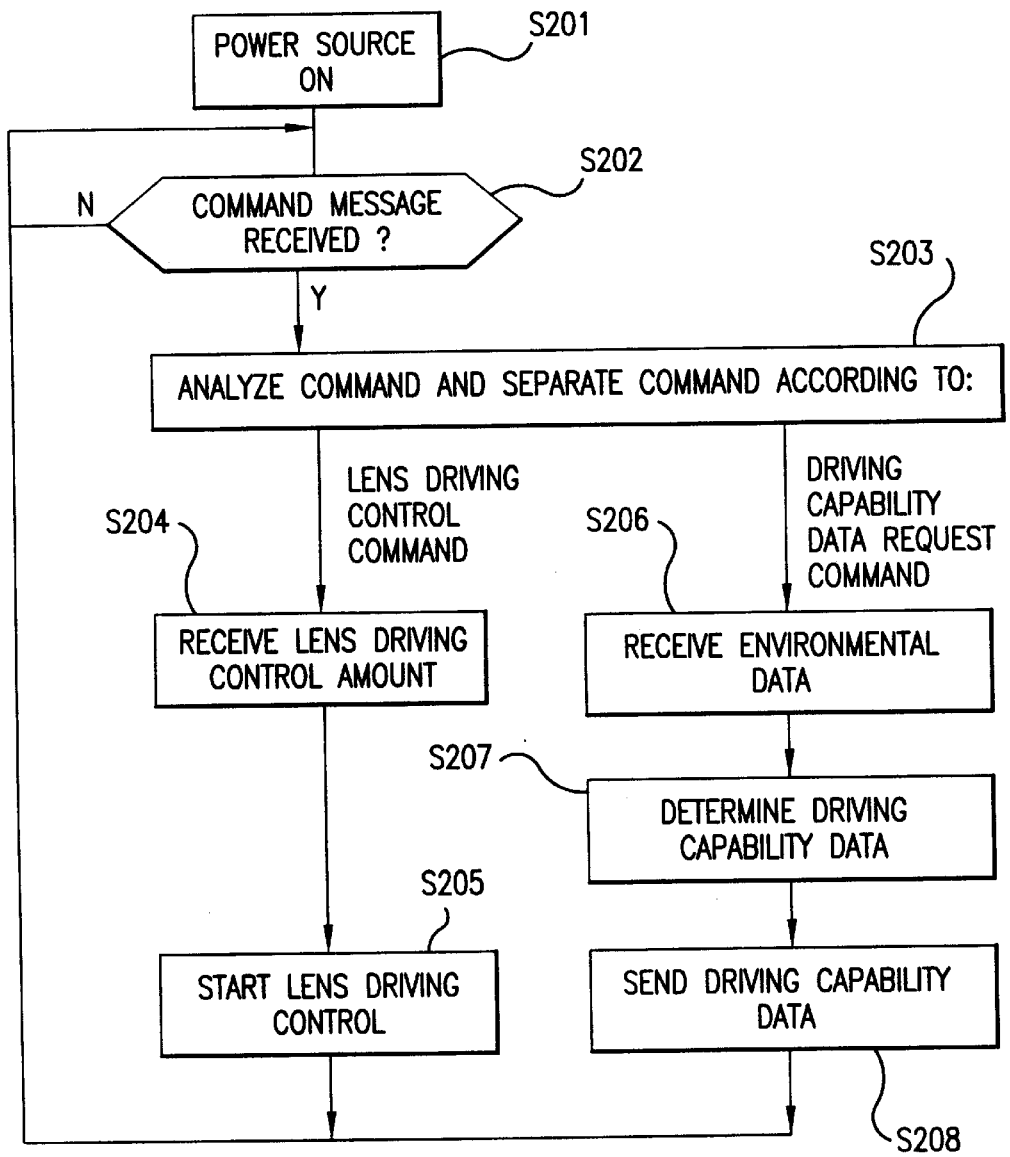
FIG. 10 is a flow chart of the lens CPU operation of the second embodiment.

FIG. 10 is a flow chart showing the operation of the lens CPU. In addition to the steps shown in FIG. 5, the operation of the lens CPU includes steps S206 and S207. In step S203, the command is interpreted as the driving capability data request command, and the lens CPU advances to step S206. In step S206, the lens CPU receives the environmental data (i.e., the information relating to the power source voltage, the internal resistance, the temperature and the lens position). In step S207, the driving capability data are determined with reference to the chart in which the environmental data obtained and the prestored environmental data in the driving capability data memory component 106 are stored, the lens CPU advances to step S208, and the driving capability data is transmitted to the camera CPU. The remaining steps are the same as the corresponding steps of FIG. 5.

Figure 11:
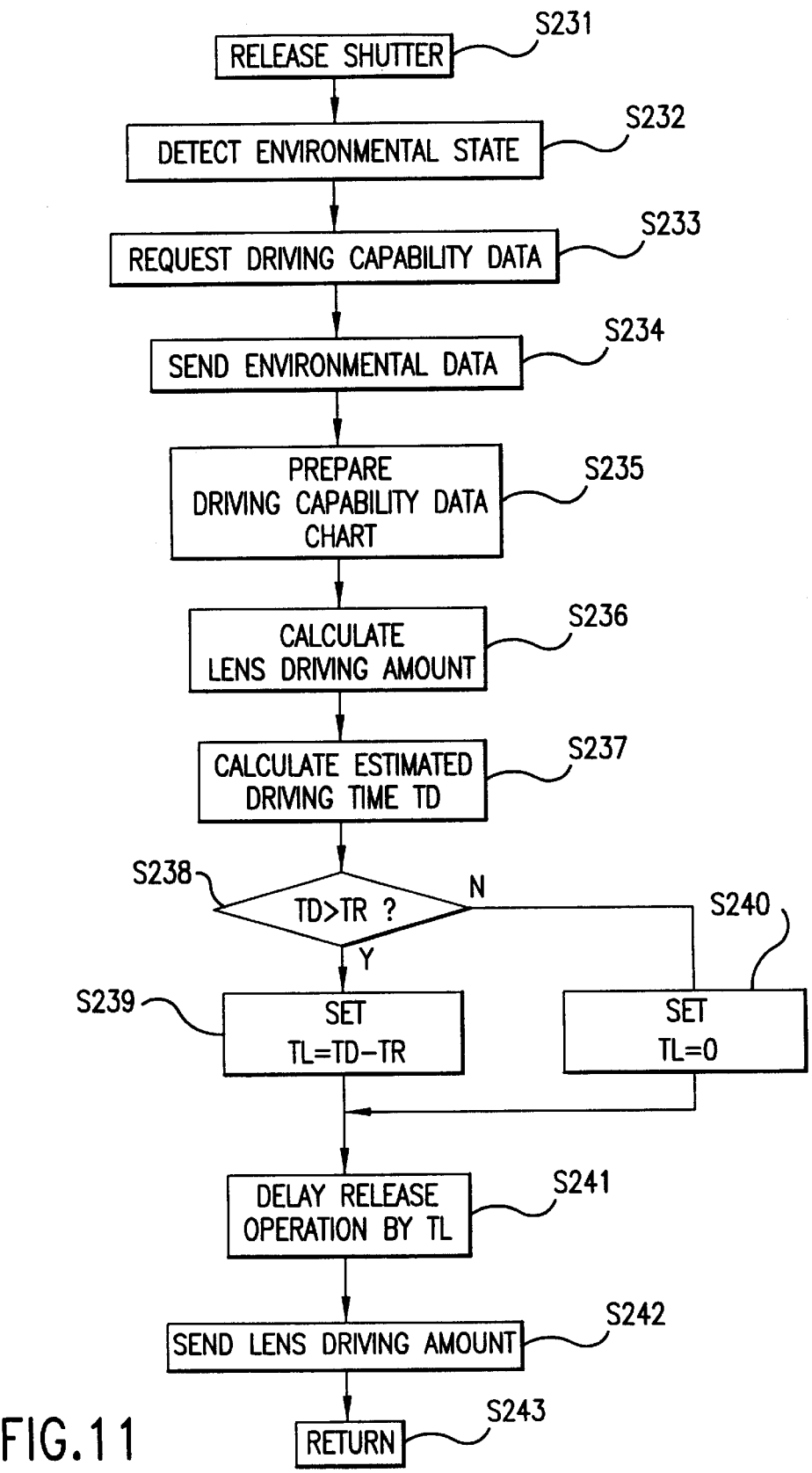
FIG. 11 is a flow chart showing the control process at the time of shutter release using the driving capability data of the second embodiment.

The operation of the camera CPU follows the steps of FIG. 5. FIG. 11 is a flow chart at the time of the shutter release operation in which the operation is controlled using the driving capability data. After the shutter is released in step S231, the lens CPU advances to step 232, and the environmental state detection component 207 detects the power source voltage, the temperature and the position. The environmental state detection component also determines the environmental data, such as the supply voltage, the internal resistance, the temperature and the lens position. In step S234, the driving capability data request command is sent to the lens 1, and at approximately the same time, the environmental data are transmitted. In step S235, the driving capability data are received from the lens CPU. In step S236, a chart relating to the lens driving amount and the lens driving time is prepared. The remaining steps are the same as the corresponding steps of FIG. 7.

Because the supply voltage, the internal resistance, the temperature and the lens position do not usually change each 100 msec, the process in steps S232 to S234 does not need to be performed each time the driving capability data are needed. Preferably, each environmental state is detected in step S232 after a timer expires, and the environmental data determined from the results are stored in the memory. As a result, the values necessary to prepare the driving capability data chart in step S235 are stored in the memory.

Figure 12:
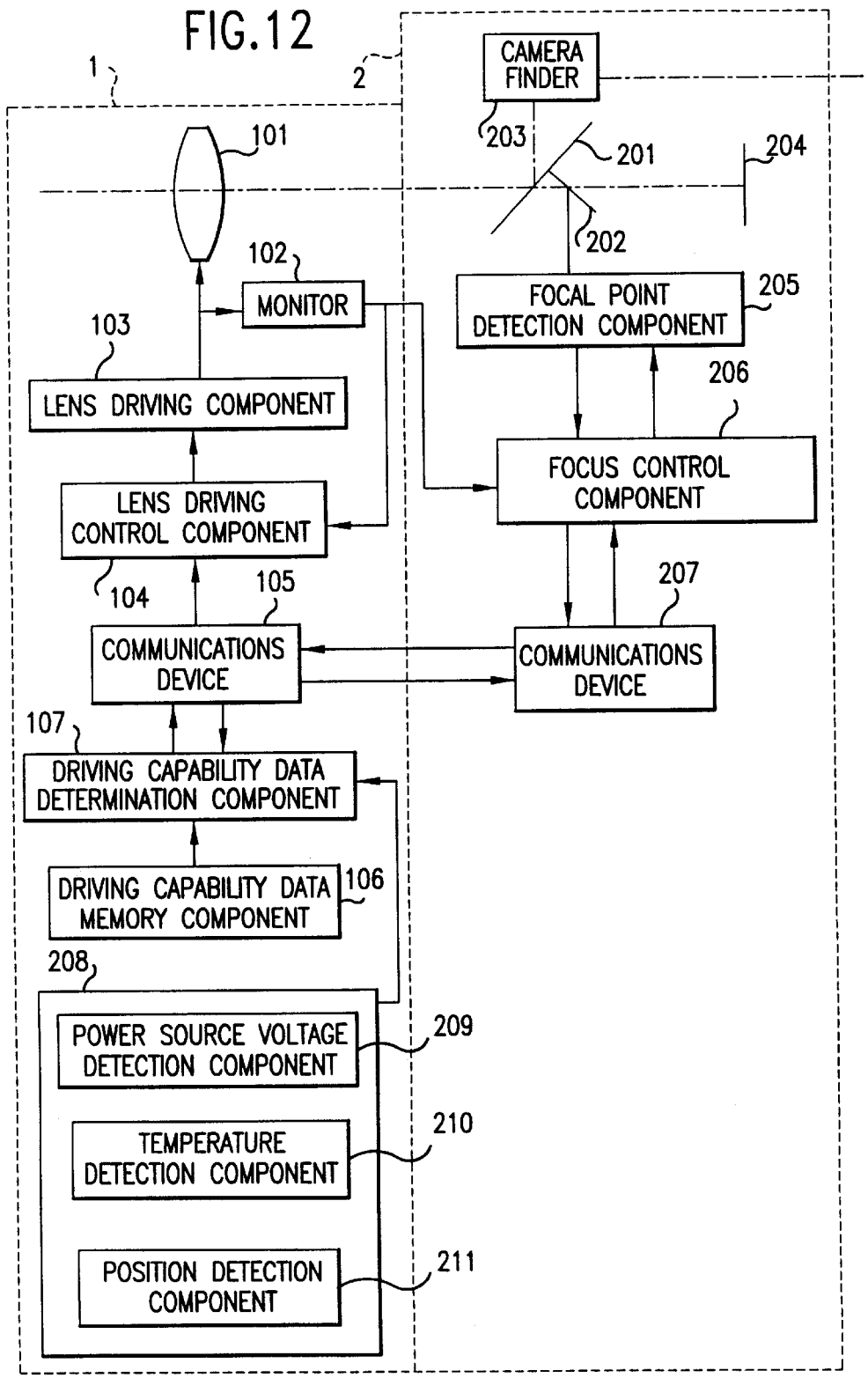
FIG. 12 is a block diagram showing the structure of a third embodiment.

FIG. 12 is a block diagram showing the structure of a third embodiment according to the present invention. In addition to the structure shown in FIG. 8 and described above, the lens 1 of the third embodiment includes the environmental state detection component 208 having the power source voltage detection component 209, the temperature detection component 210 and the position detection component 211. Because the environmental state detection component 208 is disposed within the lens 1, the camera 2 does not include such a component.

According to the third embodiment, the driving capability data determination component 107 of the lens 1 determines the information relating to the environmental states only through its connection to the environmental state detection component 208, not by communication with the camera 2. The driving capability data of the present environmental state are determined from the information relating to how the lens driving characteristics are influenced due to changes in the environmental states, which is prestored in the driving capability data memory component 106.

As a result, the environmental states of the lens can be detected more accurately than in the second embodiment, and the communication load between the lens 1 and the camera 2 can be reduced. In addition, the structure of the environmental state detection component 108 can be reduced according to the environmental state requirements of the lens driving characteristics. In other words, depending upon the particular lens being used, some of the structural elements of this embodiment can be eliminated. In addition, the lens can include a lens absolute position detection component (not shown) to detect an absolute position of the lens along the optical axis, i.e. the amount of extension of a focusing lens from a fixed point of reference. The point of reference could be, for example, the position of the focusing lens when not extended at all, or the position of the focusing lens relative to the camera body. The detection of the absolute position of the lens assists in accounting for relatively great load torque changes.

The operation of the lens CPU follows the steps shown in FIG. 10, except for the following differences. Instead of receiving the environmental data in step S206, the power source voltage, the temperature and the lens position are detected by the environmental state detection component 208. In step S207, the driving capability data from the information relating to these environmental states are determined, and in step S208, the driving capability data are transmitted to the camera 2. The remaining steps are the same as the corresponding steps of FIG. 10.

As discussed above, if the environmental states do not change within a short span of time, steps S206 and S207 do not need to be performed for each driving capability data request command. Because the environmental data are not sent to the lens 1, the operation of the camera CPU follows the steps shown in FIGS. 6 and 7 of the first embodiment.

Figure 13:
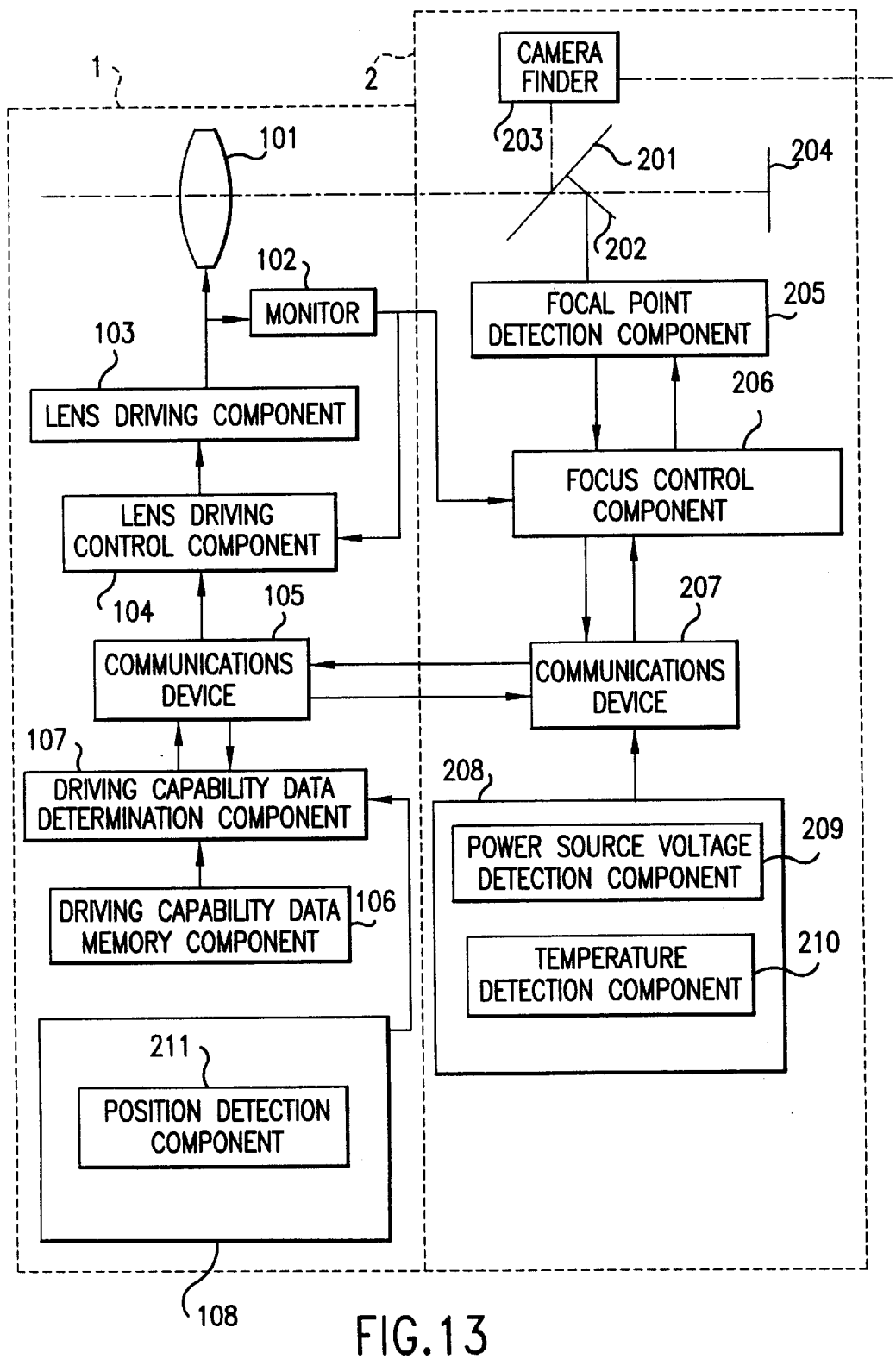
FIG. 13 is a block diagram showing the structure of a fourth embodiment.

FIG. 13 is a block diagram showing the structure of a fourth embodiment according to the present invention. The structure of the lens 1 is the same as the lens 1 shown of the third embodiment in FIG. 12. The lens 1 includes the lens environmental state detection component 108. In addition, the structure of the camera 2 is the same as the camera 2 of FIG. 8 and includes the camera environmental state detection component 208. The environmental state detection component 108 includes the position detection component 211, and the camera environmental state detection component 208 includes the power source detection component 209 and the temperature detection component 210.

According to the fourth embodiment, the driving capability data determination component 107 of the lens 1 determines the information on the environmental data relating to the environmental states, such as the power source supply capability and the temperature in the camera environmental state detection component 208 via the communications device 107. Simultaneously, the information on the environmental states relating to the lens position is transmitted from the lens environmental state detection component 108. The current driving capability data is determined from the information stored in the driving capability data memory component 106.

With this type of structure, the functions of the environmental state detection component can be allocated between the lens 1 and the camera 2 so that the camera can be used for other purposes. Alternatively, the functions of the environmental state detection component can be allocated according to which environmental states have the greatest affect on the lens driving characteristics. For example, the function of detecting information relating to an environmental state such as, e.g., the driving direction, which can be detected only by the camera, should be allocated to the environmental state detection component disposed within the camera.

In addition, the lens environmental state detection component can be structured according to how the lens driving function depends on one or more environmental states. As explained above in connection with third embodiment, a lens absolute position detection component and the like can be included in the lens environmental state detection component. Therefore, the functions of the environmental state detection component can be allocated efficiently without wasting space.

The operation of the lens CPU of the fourth embodiment follows the steps of FIG. 10, except for the following difference. The environmental data are received from the camera 2 at step S206, and simultaneously, the lens position is detected by the lens environmental state detection component 108. The operation of the camera CPU follows the corresponding steps of FIG. 6 and FIG. 10. The only difference is the structure of the camera environmental state detection component 208.

Figure 14:
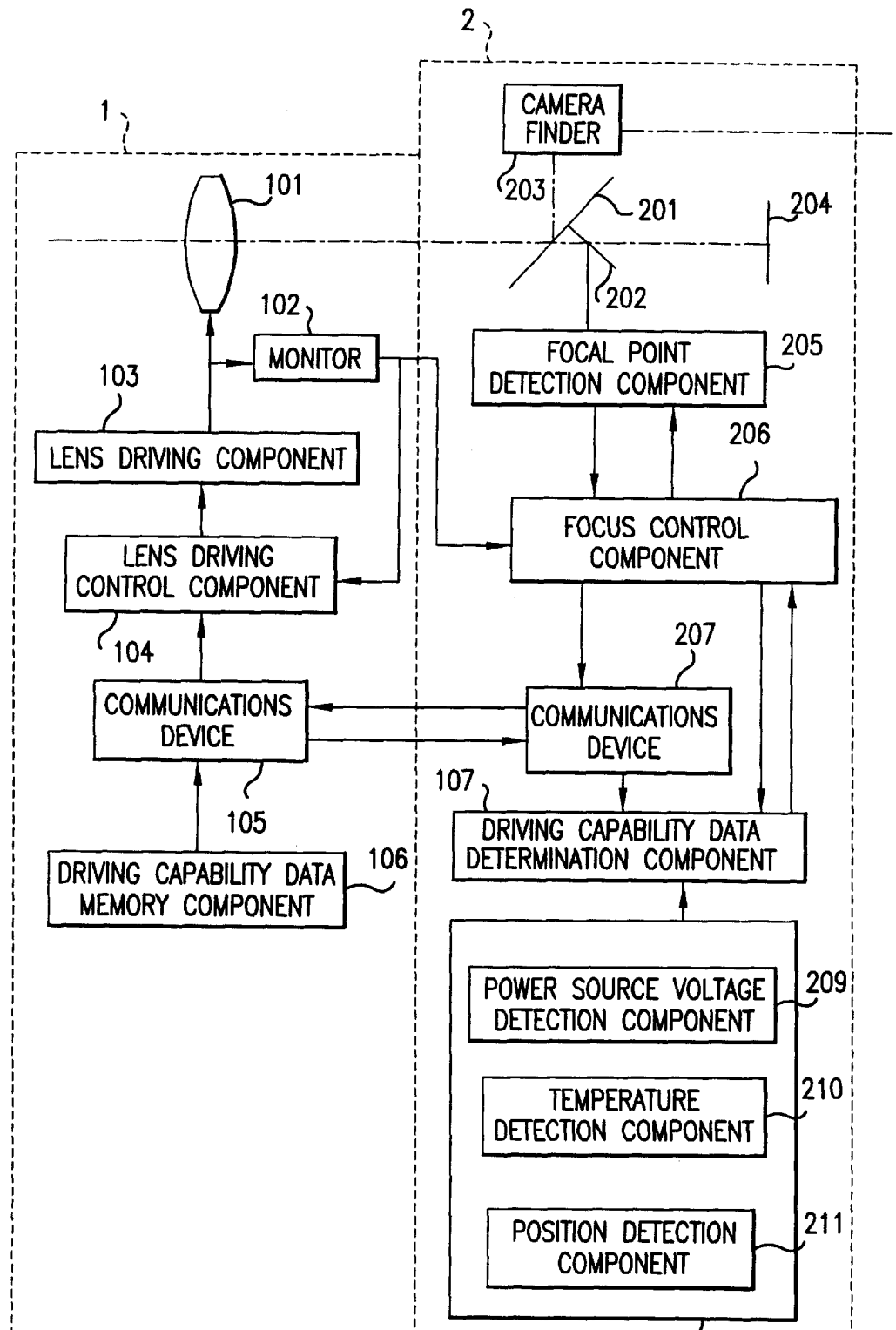
FIG. 14 is a block diagram showing the structure of a fifth embodiment.

FIG. 14 is a block diagram showing the structure of a fifth embodiment according to the present invention. In addition to the structure shown in FIG. 1, the camera 2 of the fifth embodiment includes the driving capability data determination component 107 and the environmental state detection component 208. The environmental state detection component 208 includes the power source voltage detection component 209, the temperature detection component 210 and the position detection component 211. The values stored in the driving capability data memory component 106 are the same as those of the second embodiment, and the information on how the environmental characteristics influence lens driving is also stored in memory.

The values stored in the driving capability data memory component 106 during the initial communication at the time when the lens 1 is mounted to the camera 2, are received via the communications device 207 of the camera 2. These values are stored in the memory component (not shown) of the camera 2. The driving capability data determination component 212 of the camera 2 determines the lens driving capability data relative to that environmental state. The lens driving capability data is based upon the environmental states relating to the power source supply capability, the temperature and the lens position detected by the environmental state detection component 208, and the information relating to how changes in the environmental states influence the lens driving characteristics stored in the memory and received from the lens 1. This determination method is the same as the method explained above in connection with the second embodiment.

With such a structure, communication between the lens 1 and the camera 2 is required only at the initial time when the lens is mounted. When the camera 2 requires the lens driving capability, the driving capability data from the environmental states can be determined by the camera 2 itself without communication between the camera 2 and the lens 1. Accordingly, the communications load is reduced.

The operation of the lens CPU follows the steps of FIG. 5. The driving capability data request from the camera 2, however, can be accomplished only at the time of the initial communication with the lens 1. The operation of the camera CPU follows the corresponding steps of FIG. 6. The communication with the lens 1 when the power source is initialized in step S121. At that time, the driving capability data request command is issued. Subsequently, the driving capability data, which includes the information relating to how changes in the environmental states influence the lens driving characteristics, are received and stored in the memory. The remaining steps are the same as the corresponding steps of FIG. 6.

Figure 15:
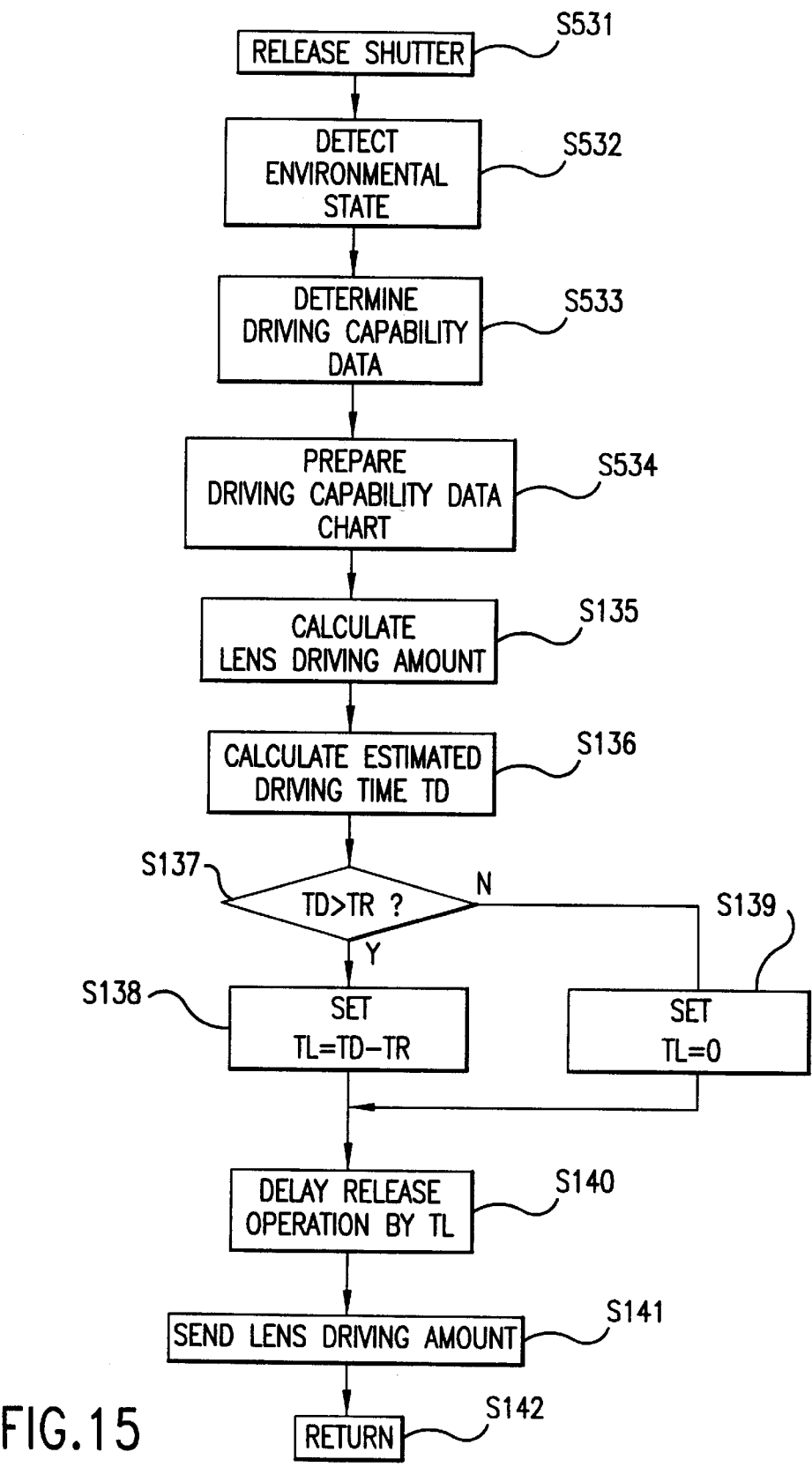
FIG. 15 is a flow chart showing the control process at the time of shutter release using the driving capability data of the second embodiment.

FIG. 15 is a flow chart at the time of shutter release in which the control is based on the driving capability data. After the shutter is released in step S531, the camera CPU advances to step 532. In step S532, the power source voltage, the temperature, and the position are detected by the environmental state detection component 208. In step S533, the driving capability data of the current environmental state are determined by the driving capability data determination component 212 from the driving capability data relating to these environmental states. The effect of the changes to the environmental states which are received during the initial lens communication, are stored in the memory. In step S534, the relationship between the lens driving amount and the driving time is configured as a chart using the driving capability data. The remaining steps are the same as the corresponding steps of FIG. 7.

According to a fifth embodiment of the invention, the driving capability data received from the lens 1 include the information on the effect of the changes in the same environmental states as the values stored in the driving capability data memory component 106 of the second embodiment. If the driving sources of various types of lenses and the driving control method are the same, and the influence of the environmental states on the lens driving functions is also the same, the affect on the driving function induced by the environmental states can be estimated. The driving capability data received from the lens 1 can be only the data relating to one of the representative environmental states, similar to the first embodiment. The driving capability data determination component 212 stores the degree of the effect on the driving function induced by the environmental state that is common to various types of lenses in memory. The driving capability data in the current environmental state are estimated and determined from the driving capability data in the representative environmental state received from the lens 1.

As explained above, according to the first embodiment, the lens includes a memory component that stores the driving capability data showing the relationship between the different lens driving amount and the driving time for each lens. This driving capability data can be transmitted to the camera from the lens via the communications device 105. As a result, appropriate focus control can be maintained at all times.

According to the second embodiment, the third embodiment and the fourth embodiment, the lens includes the memory component that stores the driving capability data, including the information on how changes in the environmental states influence the driving capability characteristics. The information relating to the environmental states, such as temperature and the like, is collected by the camera and transmitted to the lens via the communications device, or is collected by the lens itself. In this manner, the driving capability determination component determines the driving capability data showing the relationship between the lens driving amount and the driving time in the current environmental states at all times. The determined driving capability data are transmitted to the camera from the lens via the communications device. Accordingly, the focus control is suitable for all times, even in different environmental states.

According to the fifth embodiment, the driving capability data are transmitted to the camera from the lens, and the camera determines the final driving capability relative to the present environmental state. For that reason, the camera obtains the driving capability data from the lens only one time (i.e., at the time when the power source is initialized or the lens is mounted). Therefore, the communication load between the camera and the lens is reduced. In addition, the structure of the lens CPU can be simplified.

Although the invention has been described in conjunction with specific embodiments thereof, many alternatives, modifications and variations will be apparent to those skilled in the art. Accordingly, the preferred embodiments of the invention as set forth herein are intended to be illustrative, not limiting. Various changes to the invention may be made without departing from its true spirit and scope as defined in the following claims.

What is claimed is:

1. A combination of a camera and a detachable lens barrel, the combination comprising:

at least one photographic lens that forms a photographic image at a designated position in said camera;

a control amount calculation device that determines a lens driving control amount;

a lens driving control device that controls said at least one photographic lens based on said lens driving control amount;

a lens driving device coupled to said at least one photographic lens and linked to said lens driving control device, said lens driving device driving said at least one photographic lens along an optical axis in accordance with said lens driving control amount;

a memory device linked to said lens driving control device, said memory device storing lens driving capability data, said lens driving capability data including at least a characteristic lens driving amount and a corresponding lens driving time relating to said at least one photographic lens; and a communications device linked to said lens driving control device, said communications device being connectable to said camera, enabling communication between said lens driving control device and said camera such that said lens driving capability data, including the lens driving time, can be communicated to said camera for controlling at least one occurrence of at least one photographic operation, including at least one focusing operation.

2. The combination of claim 1, further comprising a data determination device linked to said memory device, wherein said data determination device determines said lens driving capability data in accordance with said lens driving control amount.

3. The combination of claim 1, further comprising an environmental state detection device linked to said memory device that detects an environmental state approximately simultaneously with a release of a shutter, said environmental state affecting said lens driving capability data stored in said memory device.

4. The camera of claim 1, wherein said lens driving capability data is stored in said memory device in accordance with at least one of a plurality of environmental states, said driving capability data including at least a lens driving amount and a corresponding lens driving time wherein said driving time also corresponds with said at least one of a plurality of environmental states.

5. The combination of claim 3, wherein said environmental state detection device detects a power supply capability of a power source of said camera.

6. The combination of claim 5, wherein said power supply capability includes a voltage capability measurement.

7. The combination of claim 5, wherein said power supply capability includes a resistance of the power source measurement.

8. The combination of claim 3, wherein said environmental state detection device detects a temperature.

9. The combination of claim 3, wherein said environmental state detection device detects a position of said at least one photographic lens along the optical axis thereof.

10. The combination of claim 1, further comprising an environmental state detection device that detects an environmental state approximately simultaneously with a release of a shutter and a data determination device linked to said memory device, wherein said data determination device determines lens driving capability data in accordance with said lens driving control amount and said environmental state.

11. The combination of claim 1, further comprising an environmental state detection device that detects an environmental state approximately simultaneously with a release of a shutter and a data determination device linked to said memory device, wherein said data determination device determines lens driving capability data in accordance with said lens driving control amount, said environmental state, and data received from said communications device.

12. The combination of claim 1, wherein said lens driving capability data are transmitted via said communications device to said camera at least once during at least one of a focus detection operation and a lens driving control amount calculation.

13. The combination of claim 1, wherein said lens driving capability data are transmitted to said camera via said communications device at least once before a focus detection operation.

14. A camera system comprising a camera and a detachable camera lens barrel, said camera having a focal point detection device and a control amount calculation device, said camera system comprising:

at least one photographic lens that forms a photographic image of a subject at a designated position in said camera, said at least one photographic lens having a focal point state detectable by said focal point detection device;

a lens driving control device that controls said at least one photographic lens based on a lens driving control amount determined by said control amount calculation device in accordance with results from said focal point detection device;

a lens driving device coupled to said at least one photographic lens and linked to said lens driving control device, said lens driving device driving said at least one photographic lens along an optical axis;

a memory device linked to said lens driving control device, said memory device storing lens driving capability data, said lens driving capability data including at least a characteristic lens driving amount and a corresponding lens driving time relating to said at least one photographic lens; and a communications device linked to said lens driving control device, said communications device being connectable to said camera, enabling communication between said lens driving control device and said camera such that said lens driving capability data, including said lens driving time, can be communicated to said camera for performing at least one photographic operation, including at least one focusing operation.

15. The camera system of claim 14, wherein said camera further comprises an environmental state detection device that detects an environmental state approximately simultaneously with a release of a shutter.

16. The camera system of claim 15, wherein said camera lens barrel further comprises a data determination device linked to said lens control device, wherein at a time when said control amount calculation device operates, said data determination device determines lens driving capability data in accordance with said lens driving control amount and said environmental state.

17. The camera system of claim 15, wherein said camera further comprises a data determination device linked to said control amount calculation device, wherein said data determination device determines lens driving capability data in accordance with said lens driving control amount and said environmental state.

18. The camera system of claim 17, said camera lens barrel further comprising an environmental state detection device that detects an environmental state approximately simultaneously with a release of a shutter.

19. The camera system of claim 18, wherein said camera lens barrel further comprises a data determination device linked to said lens driving control device, wherein at a time when said control amount calculation device operates, said data determination device determines lens driving capability data in accordance with said lens driving control amount and said environmental state.

20. The camera system of claim 18, wherein said camera lens barrel further comprises a data determination device linked to said lens driving control device, wherein at a time when said control amount calculation device operates, said data determination device determines lens driving capability data in accordance with said lens driving control amount, a camera environmental state detected by said environmental state detection device of said camera and a lens barrel environmental state detected by said environmental state detection device of said camera lens barrel.

21. The camera system of claim 18, wherein said environmental state detection device of said camera lens barrel includes at least a power source voltage component and a temperature detection component, and wherein said environmental state detection device includes at least a position detection component that detects a position of said at least one photographic lens along the optical axis thereof.

22. The camera system of claim 14, said camera lens barrel further comprising an environmental state detection device that detects an environmental state approximately simultaneously with a release of a shutter.

23. The camera system of claim 15, wherein said environmental state detection device detects a power supply capability of the power source.

24. The camera system of claim 23, wherein said power supply capability includes a voltage measurement.

25. The camera system of claim 23, wherein said power supply capability includes a resistance of the power source measurement.

26. The camera system of claim 15, wherein said environmental state detection device detects a temperature.

27. The camera system of claim 15, wherein said environmental state detection device detects a position of said at least one photographic lens along the optical axis thereof.

28. The camera system of claim 14, wherein said lens driving capability data are transmitted to said camera via said communication device at least once during at least one of a focus detection operation and a lens driving control amount calculation.

29. The camera system of claim 14, wherein said lens driving capability data are transmitted to said camera via said communication device at least once before a focus detection operation.

30. A method of focusing a camera having a detachable camera lens barrel with at least one photographic lens, a lens driving control device, a lens driving device, a memory device and a communications device, the method comprising:

storing driving capability data in said memory device;

forming an image of a photographic subject with said at least one photographic lens;

retrieving said driving capability data from said memory device, wherein said driving capability data include at least a characteristic lens driving amount and a corresponding lens driving time relating to said at least one photographic lens;

communicating said driving capability data to said camera with said communications device such that said camera has said driving capability data, including said lens driving time, available for controlling at least one occurrence of at least one photographic operation, including at least one focusing operation;

determining a lens driving control amount; and driving said at least one photographic lens with said lens driving device along an optical axis in accordance with said lens driving control amount.

31. The method of claim 30, further comprising determining said driving capability data with a driving capability data determination component.

32. The method of claim 31, wherein said step of determining said driving capability data includes receiving environmental state data via said communications device.

33. The method of claim 31, wherein said step of determining said driving capability data includes detecting environmental state data with an environmental state detection device disposed within said at least one photographic lens.

34. The method of claim 31, wherein said step of determining said driving capability data includes detecting environmental state data with an environmental state detection device disposed within said camera.

35. The method of claim 32, wherein said step of receiving environmental state data includes receiving power source voltage data, temperature data and lens position data corresponding to a position of the at least one photographic lens along the optical axis thereof.

36. The method of claim 33, wherein said step of detecting environmental state data includes detecting power source voltage data, temperature data and lens position data corresponding to a position of the at least one photographic lens along the optical axis thereof.

37. The method of claim 34, wherein said step of detecting environmental state data includes detecting power source voltage data, temperature data and lens position data corresponding to a position of the at least one photographic lens along the optical axis thereof.

38. The method of claim 31, wherein said step of determining said driving capability data includes receiving power source data and temperature data from said camera via said communications device and detecting said lens position data corresponding to a position of the at least one photographic lens along the optical axis thereof.

39. The method of claim 38, wherein said step of determining said driving capability data occurs approximately when said at least one photographic lens is connected to said camera.

40. A camera system having a lens comprising:

a memory for storing lens driving capability data representing a relationship between lens driving times and corresponding lens driving amounts characteristic of the lens; and a controller connected to the memory and to the lens for determining a lens driving amount, determining a lens driving time based on the lens driving capability data stored in the memory and the lens driving amount, and controlling at least one photographic operation of the camera, including at least one focusing operation, in accordance with the determined lens driving time.

41. A method of controlling at least one photographic operation of a camera having a lens, a controller for controlling movement of the lens and a memory for storing lens driving capability data of the lens, the method comprising:

determining a lens driving amount;

determining a lens driving time based on the lens driving capability data stored in the memory and the lens driving amount, the lens driving capability data representing a relationship between lens driving times and corresponding lens driving amounts characteristic of the lens; and controlling the at least one photographic operation of the camera, including at least one focusing operation, in accordance with the determined lens driving time.

* * * * *